Oct. 3, 1939.  F. K. McCUNE  2,175,027
EXPOSURE METER
Filed Oct. 23, 1937
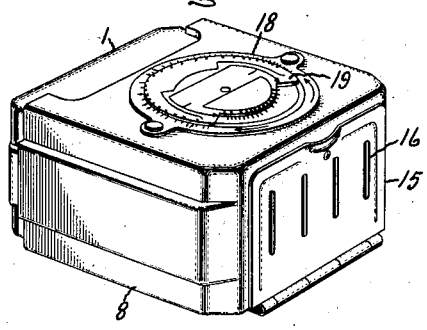
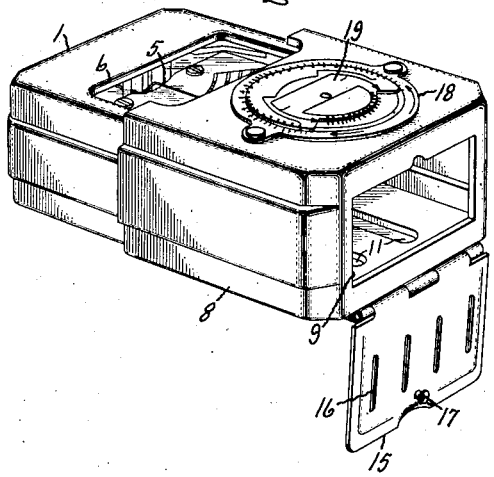
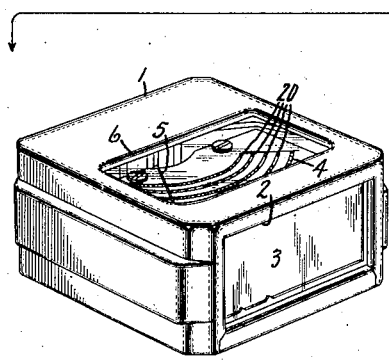
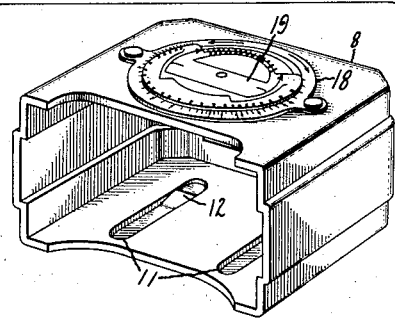
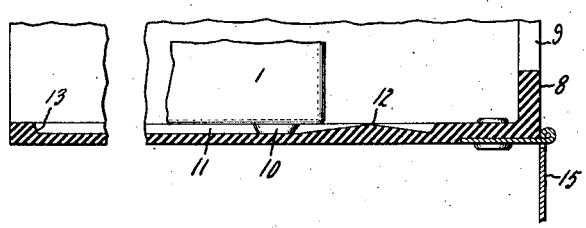
Inventor:
Francis K. McCune
by Harry E. Dunham
His Attorney.

Patented Oct. 3, 1939

2,175,027

UNITED STATES PATENT OFFICE 2,175,027

EXPOSURE METER

Francis K. McCune, Swampscott, Mass., assignor to General Electric Company, a corporation of New York Application October 23, 1937, Serial No. 170,665

7 Claims. (Cl. 88—23)

My invention relates to exposure meters, that is, to apparatus which may be used in connection with a camera for determining the proper exposure under the various conditions affecting the same such as the amount of illumination, the shutter speed, the f-value, and the film speed. The object of my invention is the provision of an improved exposure meter which is simple in construction, efficient in operation and inexpensive to manufacture. Another object is the provision of such a meter having a scale and having a movable part adapted in one position to limit the light affecting the meter to that coming in a desired angle and in another position to protect the scale and to materially reduce the size of the meter.

A further object of my invention is in the provision of such a meter having means adapted to maintain the above-mentioned movable part in a predetermined extended position but which readily enables it to be removed when desired.

My invention will be better understood from the following description taken in connection with the accompanying drawing, and its scope will be pointed out in the appended claims.

Referring to the drawing, Fig. 1 is a perspective view of an embodiment of my invention in a contracted condition; Fig. 2 is a similar view but with the hood of the meter in its extended position; Fig. 3 shows the meter with the hood detached and Fig. 4 is a fragmentary cross sectional view of co-operating portions of the meter drawn to a larger scale.

The exposure meter constituting my invention comprises broadly a light responsive instrument including a light-sensitive member and a co-operating scale and pointer for measuring general illumination and a hood which may be readily attached to and detached from the instrument. The light responsive instrument I is shown substantially like that disclosed in the co-pending application of James H. Goss and myself, Serial No. 48,504, filed November 6, 1935, and assigned to the same assignee as my present application. As in that application, the instrument has a hollow casing of rectangular form made preferably of a phenolic condensation product such, for example as Bakelite. At one end of the casing is the rectangular opening or window 2 through which the light sensitive member 3 is exposed. This member may be of any suitable current generating type, preferably the type disclosed and claimed in the co-pending application of Clarence W. Hewlett, Serial No. 716,677, filed March 21, 1934, and assigned to the same assignee as the present application.

Enclosed by the same casing and electrically connected with the light sensitive member so as to be actuated in response to the voltage produced thereby is a galvanometer structure or more specifically a microammeter having the scale 4 and the co-operating pointer 5. The scale is visible through the opening or window 6 in a side face of the casing, the window preferably having a glass cover to exclude dust and dirt. While the scale may show indicia including several sets of graduations for purposes which will be explained later, it preferably has one set reading in units of illumination, for example, foot candles whereby the instrument when used alone, that is, without the hood, may be employed as a foot candle meter for measuring general illumination.

Because of the shallowness of the window 2 through which light reaches the light sensitive member this member responds to the average light flux reaching it in a solid angle of nearly $2\pi$ steradians. This of course is desirable when the instrument is employed to measure the general illumination. When, however, it is employed in connection with a camera in order to determine the proper exposure, that is as an exposure meter, it becomes necessary to reduce the angle of the light affecting the light sensitive member to substantially that affecting the plate or film of the camera.

For this purpose and for other purposes to be described later, I have provided the above described instrument with the hood 8 which conforms to the rectangular form of the casing I and is constructed to slide readily thereon. That side of the hood opposite the open end thereof has the opening or window 9 the dimensions of which are substantially the same as the window 2 in the casing I. The hood is intended to have two definite positions on the instrument casing I, one a contracted position in which it almost completely encloses the casing as illustrated by Fig. 1 and the other an extended position in which the window 9 is spaced at the proper distance from the light sensitive member to reduce or limit the angle of the light reaching that member the desired amount. Projecting from the rear face of the casing are two studs, one of which is shown at 10 in Fig. 4, and on an inner face of the hood are the two guide grooves 11 for receiving them. Near the inner ends of these grooves the depth decreases so as to form a hump as shown at 12 over which the studs ride when the hood is moved to the closed or contracted position. The hood is thereby yieldingly maintained in that position it being understood that the wall of the hood readily admits of the necessary slight deformation. Preferably the hood is so proportioned that it is slightly deformed when assembled on the casing and its natural resiliency provides sufficient friction to maintain it in whatever position it is left on the casing yet permitting one to slide it with ease. With the hood in its fully extended position as shown by Fig. 2 in which position the window therein is at the proper distance from the light sensitive member the studs engage the outer ends 13 of the grooves. These ends constitute stops to limit the outward movement of the hood but as pointed out above the hood wall will yield and if greater force is employed the hood may be completely removed.

In order to increase the range of illumination intensities with which the exposure meter may be used, I have provided it with a multiplier which is represented as comprising the cover 15 hinged to the hood at one side of the window therein and having a plurality of slits 16. The total area of these slits is one tenth of the area of the window 9 so that when the cover is closed the deflection of the pointer 5 is only one tenth of that with the cover open. It will be noted that the slits 16 are nearly as long as the window 9 is wide and that the slits are so spaced that the two outermost ones are close to the ends of that window. By this construction I am able to maintain the useful dimensions of the light opening equal to the dimensions of the light sensitive member or substantially so whether the cover is open or closed. The cover is shown provided with the detent 17 by which it is retained in closed position.

When the hood is in its fully extended position as illustrated by Fig. 2 whereby the meter is adapted for use in connection with a camera for the determination of various factors affecting the exposure the hood is sufficiently far removed from the casing 1 that the scale 4 therein is fully exposed to view. When, however, the hood is in its contracted position as shown by Fig. 1 it completely covers the window in the casing behind which lies the scale and pointer thereby protecting the scale, the pointer and the glass covering the window from injury. With the hood in this position the meter is more compact being greatly reduced in size, whereby it more readily fits in one's pocket.

On that wall of the hood which covers the scale when the hood is in the contracted position, I have provided a calculator comprising the fixed plate 18 shown as having ears at opposite sides by which it is secured to the hood and the rotatably mounted co-operating plate 19. On these plates are various scales such as those reading in units of illumination like the aforementioned scale 4 and those reading in f-values, shutter speeds and film speeds. By noting the reading on the scale 4 of the average illumination in the angle of light admitted to the light sensitive member and knowing the speed of the film employed in the camera one may select any one of various combinations of f-value and shutter speed by using the calculator in a well understood manner.

For the convenience of those who always use films of the same speed I have provided the scale 4 with additional indicia, represented at 20, whereby for several different shutter speeds one may read directly the proper f-value on the scale for that particular film speed and thus avoid the use of the calculator.

I have chosen the particular embodiment described above as illustrative of my invention and it will be apparent that various modifications may be made without departing from the spirit and scope of my invention, which modifications I aim to cover by the appended claims.

What I claim as new and desire to secure by Letters Patent of the United States, is:

1. An exposure meter comprising a light responsive instrument including an enclosure containing a light sensitive member and an indicating instrument having a scale connected to respond thereto, said member and said scale being exposed on the surface of the enclosure, and an enclosing member slidably mounted on said light responsive instrument, said member being constructed to cover said scale when in one position and to reduce the angle of the light reaching said member when in another position.

2. An exposure meter comprising a casing, a measuring instrument enclosed thereby having a scale exposed to view at one side of the casing and a light sensitive member exposed at another side thereof, and a hood slidably mounted on said casing and provided with a light opening opposite said member, said hood in one position serving to cover said scale and in another position serving to limit the angle at which light may reach said member.

3. An exposure meter comprising a casing having a side opening and an end opening, a light responsive instrument enclosed thereby having a scale exposed to view through said side opening and a light sensitive member exposed through said end opening, a hood mounted to slide on said casing and provided with an opening opposite said member and cooperating means on said casing and hood for determining an extended position of the hood on the casing whereby the hood when in that position limits the light received by said member to that from a desired angle and when in a closed position covers said scale.

4. An exposure meter comprising a light meter having at one side thereof a pointer and a cooperating scale bearing indicia of illumination, a hood slidably mounted on said meter whereby in one position of the hood a part thereof covers said scale and in another position the scale is exposed to view and exposure calculating means comprising relatively movable elements mounted on said part, one of said elements having indicia corresponding to that on said scale.

5. An exposure meter comprising a light meter having at one side thereof a scale bearing indicia of illumination and having a light sensitive member at another side thereof, a hood on said light meter having an opening arranged opposite said member, said hood being adapted to be moved from a position in which a part thereof covers said scale to a position in which said scale is uncovered and said opening limits the light reaching said member to that of a desired angle and calculating means comprising relatively movable elements mounted on said part of the hood, one of said elements having indicia corresponding to those on said scale.

6. An exposure meter comprising a light meter unit including a scale and a light sensitive member, a hood having an opening for admitting light to said member, said hood being slidable on said unit from one position wherein the scale is covered thereby to an extended position wherein the opening therein is in spaced relation with said member and means for frictionally retaining said hood in said extended position but readily allowing the removal of the hood from the unit.

7. An exposure meter comprising a light meter unit including a scale and a light sensitive member, a hood slidable on said unit from a contracted position in which the meter requires a minimum of space to an extended operable position, said hood having a window for admitting light to said member and cooperating means on said unit and hood for frictionally retaining the hood in said contracted position and limiting movement thereof to said extended position.

FRANCIS K. McCUNE.